United States Patent [19]
Treadwell et al.

[11] Patent Number: 6,120,976
[45] Date of Patent: Sep. 19, 2000

[54] LASER ABLATED FEATURE FORMATION METHOD

[75] Inventors: Daniel J. Treadwell, Cedar Park; Curtis L. Shoemaker, Round Rock, both of Tex.

[73] Assignee: 3M Innovative Properties Company, Saint Paul, Minn.

[21] Appl. No.: 09/197,127

[22] Filed: Nov. 20, 1998

[51] Int. Cl.[7] .................................................. B23K 26/00
[52] U.S. Cl. .......................... 430/322; 430/396; 430/945; 430/320; 359/201; 359/203; 359/209; 219/121.8
[58] Field of Search .................................... 430/320, 321, 430/945, 5, 396, 322; 359/201, 203, 209; 606/4, 5; 219/121.73, 121.74, 121.8

[56] References Cited

U.S. PATENT DOCUMENTS

| | | | |
|---|---|---|---|
| 1,818,410 | 8/1931 | Leventhal | 359/201 |
| 4,118,109 | 10/1978 | Crawford et al. | 350/285 |
| 4,733,944 | 3/1988 | Fahlen et al. | 350/167 |
| 4,822,974 | 4/1989 | Leighton | 219/121.67 |
| 4,871,904 | 10/1989 | Metlitsky et al. | 359/201 |
| 4,923,772 | 5/1990 | Kirch et al. | 430/5 |
| 4,940,881 | 7/1990 | Sheets | 219/121.69 |
| 5,263,014 | 11/1993 | Kasahara | 359/209 |
| 5,298,351 | 3/1994 | Bobroff et al. | 430/5 |
| 5,378,137 | 1/1995 | Asakawa et al. | 425/174.4 |
| 5,411,502 | 5/1995 | Zair | 606/10 |
| 5,414,559 | 5/1995 | Burghardt et al. | 359/623 |
| 5,526,167 | 6/1996 | Peng | 359/209 |
| 5,609,778 | 3/1997 | Pulaski et al. | 219/121.69 |
| 5,610,733 | 3/1997 | Feldman et al. | 359/9 |
| 5,742,426 | 4/1998 | York | 359/209 |

FOREIGN PATENT DOCUMENTS

| | | | |
|---|---|---|---|
| 0280414 | 8/1988 | European Pat. Off. | 606/5 |
| 1-48693 | 2/1989 | Japan | 219/121.74 |
| 934820 | 9/1985 | U.S.S.R. | 359/209 |
| WO 93/15911 | 8/1993 | WIPO . | |

OTHER PUBLICATIONS

"Diffractive microlenses replicated in fused silica for excimer laser–beam homogenizing", Nikolajeff, et al., Applied Optics, vol. 36, No. 32, pp. 8481–8489, Nov. 10, 1997.

U.S. application No. 09/196,692, Shoemaker et al.

*Primary Examiner*—John A. McPherson
*Attorney, Agent, or Firm*—Mathew B. McNutt

[57] ABSTRACT

A method and apparatus for ablating features in a substrate, the apparatus includes a radiation source and first and second rotating transparent uniformly thick disks positioned between the radiation source and a substrate to be irradiated. The method comprises irradiating the substrate with radiation that has passed through the first and second rotating disks, wherein the first and second disks are independently rotating at different angular velocities to create a predetermined irradiation pattern on the substrate. The disks may have a relative acceleration. The method and apparatus may be used to ablate nozzles having longitudinal axes which are non-orthogonal with the surface of the substrate and which are not parallel to each other.

7 Claims, 16 Drawing Sheets

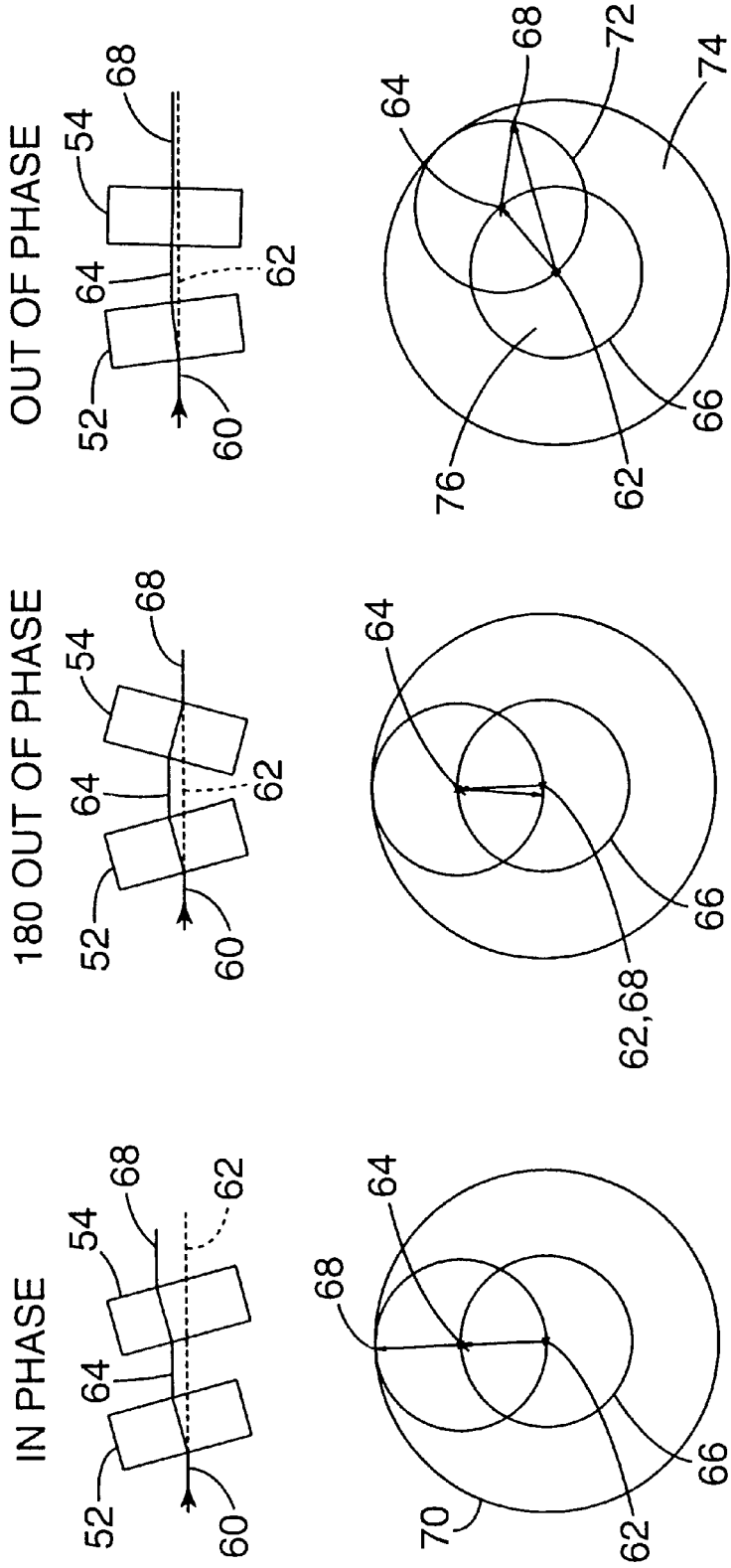

LASER ABLATED FEATURE FORMATION METHOD

BACKGROUND OF THE INVENTION

1. Field of the Invention

This invention pertains to a method and an apparatus for forming ablated features in substrates, such as by laser ablation of polymer substrates, and also to products formed by such apparatus and method. This invention specifically pertains to the formation of nozzles for fluid flow applications, and for inkjet print head applications in particular.

2. Description of the Related Art

The laser ablation of features on polymer materials using a mask and imaging lens system is well known. In this process, features on the mask are illuminated with laser light. The laser light that passes through the transparent features of the mask is then imaged onto the substrate such as a polymeric film where the ablation process occurs.

FIG. 1 illustrates a basic layout of a conventional excimer laser machining system 10. Typically, the system 10 is controlled by a computer 12 with an interface to the operator of the system. The computer controls the firing of the pulsed laser system 24 and a servo system 14. The function of the servo system 14 is to position the mask 16 and substrate chuck 18 for proper registration of the laser milled pattern with respect to other features on the substrate 19. For this purpose, a vision system (not shown) is often interfaced to the computer system. The servo system 14 or computer 12 may control an attenuator module 20, to vary the amount of UV radiation entering the system. Alternatively, the laser pulse energy may be varied by adjusting the laser high voltage or a control set point for energy, maintained by the laser's internal pulse energy control loop.

The UV beam path is indicated in this figure with arrows 22(not intended to be actual ray paths, which are not typically parallel) which show the flow of UV energy within the system. The UV power originates at the pulsed excimer laser 24. The laser 24 typically fires at 100–300 Hz for economical machining with pulses that have a duration of about 20–40 nanoseconds each. The typical industrial excimer laser is 100–150 watts of time average power, but peak powers may reach megawatts due to the short duration of the pulse. These high peak powers are important in machining many materials.

From the output end of the laser, the UV energy typically traverses attenuator 20; however, this is an optional component not present in all laser machining systems. The attenuator 20 performs either or both of two possible functions. In the first function, the attenuator 20 compensates for the degradation of the optical train. The attenuator 20 thus used, allows the laser to run in a narrow band of pulse energies (and hence a restricted range of high voltage levels), allowing for more stable operation over the long term. With new optics in the system, the attenuator 20 is set to dissipate some of the power of the laser. As the optics degrade and begin to absorb energy themselves, the attenuator 20 is adjusted to provide additional light energy. For this function, a simple manual attenuator plate or plates can be used. The attenuator plates are typically quartz or fused silica plates with special dielectric coatings on them to redirect some of the laser energy toward an absorbing beam dump within the attenuator housing.

The other possible function of the attenuator 20 is for short term control of laser power. In this case, the attenuator 20 is motorized with either stepper motors or servo system, and the attenuator is adjusted to provide the correct fluence (energy per unit area) at the substrate for proper process control.

From the attenuator 20, the UV energy propagates to a beam expansion telescope 26 (optional). The beam expansion telescope 26 serves the function of adjusting the cross sectional area of the beam to properly fill the entrance to the beam homogenizer 28. This has an important effect on the overall system resolution by creating the correct numerical aperture of illumination upon exit from the homogenizer. Typical excimer laser beams are not symmetric in horizontal vs. vertical directions. Typically, the excimer beam is described as "top hat-gaussian," meaning that between the laser discharge direction (usually vertical), the beam profile is "top hat" (initially relatively flat and dropping off sharply at the edges). In the transverse direction, the beam has a typical intensity profile that looks qualitatively gaussian, like a normal probability curve.

The expansion telescope 26 allows some level of relative adjustment in the distribution of power in these directions, which reduces (but does not completely eliminate) distortion of the pattern being imaged onto the substrate 19 due to the resolution differences in these two axes.

Between the expansion telescope 26 and homogenizer 28 is shown a flat beam folding mirror 30. Most systems, due to space limitations, will contain a few such mirrors 30 to fold the system into the available space. Generally, the mirrors may be placed between components, but in some areas, the energy density or fluence can be quite high. Therefore, mirror locations are carefully chosen to avoid such areas of high energy density. In general, the designer of such a system will try to limit the number of folding mirrors 30 in order to minimize optics replacement cost and alignment difficulty.

The UV light next enters the beam homogenizer 28. The purpose of the homogenizer 28 is to create a uniformly intense illumination field at the mask plane. It also determines the numerical aperture of the illumination field (the sine of the half angle of the cone of light impinging on the mask), which as stated above, has an impact on overall system resolution. Since certain parts of the excimer beam are hotter than others, uniform illumination requires that the beam be parsed into smaller segments which are stretched and overlaid at the mask plane. Several methods for this are known in the art, with some methods being based on traditional refractive optics, e.g., as disclosed in U.S. Pat. Nos. 4,733,944 and 5,414,559, both of which are incorporated herein by reference. The method may also be based on diffractive or holographic optics, as in U.S. Pat. No. 5,610,733, both of which patents are incorporated by reference, or on continuous relief microlens arrays (described in "Diffractive microlenses replicated in fused silica for excimer laser-beam homogenizing", Nikoladjeff, et. al, Applied Optics, Vol 36, No. 32, pp. 8481–8489, 1997).

From the beam homogenizer 28 the light propagates to a field lens 32, which serves to collect the light from the homogenizer 28 and properly couple it into the imaging lens 34. The field lenses 32 may be simple spherical lenses, cylindrical lenses, anamorphic or a combination thereof, depending on the application. Careful design and placement of field lenses 32 are important in achieving telecentric imaging on the substrate side of the lens 32.

The mask 16 is typically placed in close proximity to the field lens 32. The mask 16 carries a pattern that is to be replicated on the substrate 19. The pattern is typically larger (2 to 5 times) than the size of the pattern desired on the substrate 19. The imaging lens 34 is designed to de-magnify the mask 16 in the course of imaging it onto the substrate 19. This has the desired property of keeping the UV energy density low at the mask plane and high at the substrate plane. High de-magnification usually imposes a limit on the field size available at the substrate plane.

The mask 16 may be formed from chromium or aluminum coated on a quartz or fused silica substrate with the pattern being etched into the metallic layer by photolithography or other known means. Alternatively, the reflecting and/or absorbing layer on the fused silica mask substrate 16 may comprise a sequence of dielectrics layers, such as those disclosed in U.S. Pat. Nos. 4,923,772 and 5,298,351, both of which are incorporated herein by reference.

The purpose of the imaging lens 34 is to demagnify and relay the mask pattern onto the substrate 19. If the pattern is reduced by a factor of M in each dimension, then the energy density is raised by $M^2$ multiplied by the transmission factor of the imaging lens 34 (typically 80% or so). In its simplest form, the imaging lens 34 is a single element lens. Typically, the imaging lens 34 is a complex multi-element lens designed to reduce various aberration and distortions in the image. The imaging lens 34 is preferably designed with the fewest elements necessary to accomplish the desired image quality in order to increase the optical throughput and to decrease the cost of the imaging lens 34. Typically, the imaging lens 34 is one of the most expensive parts of the beam train.

As noted above, the imaging lens 34 creates a demagnified image of the pattern of the mask 16 on the substrate 19. Each time the laser fires, an intense patterned area is illuminated on the substrate 19. As a result, etching of the substrate material results at the illuminated areas. Many substrate materials may be so imaged, especially polymeric materials. Polyimides available under various trade names such as Kapton™ and Upilex™ are the most common for microelectronic applications and inkjet applications.

The system 10 described in FIG. 1 is a "typical" system. For non-demanding applications, the system can be further simplified and still produce ablated parts, but with some sacrifice in feature tolerances, repeatability, or both. It is not unusual for systems to make some departure from this typical architecture, driven by the particular needs of the application.

There are many applications for laser ablation of polymeric materials. Some applications or portions thereof are not demanding in terms of tolerances, e.g., electrical vias, and the emphasis is on small size, high density features and low cost. Other applications require very demanding tolerances and repeatability. Examples of the latter applications are fluid flow applications such as inkjet print head nozzle manufacture and manufacture of drug dispensing nozzles. In these demanding applications, the requirements for exact size, shape, and repeatability of manufacture are much more stringent than the simpler conductive path features provided by a microelectronic via. The detailed architecture of the system is critical to obtaining tight tolerances and product repeatability. In addition, process parameters and the optical components all play important roles in obtaining the tightest possible tolerances, down to the sub-micron level.

As mentioned above, the invention relates to the formation of nozzles for inkjet print head applications and other fluid flow applications. During the firing of a thermal inkjet print head, a small volume of ink is vaporized. The vaporized ink causes a droplet of ink to shoot through an orifice (i.e., the nozzle) which is directed at the print media. The quality of thermal inkjet printing is dependent upon the characteristics of the orifice. Critical attributes of the orifice include the shape and surface condition of the bore.

One important aspect for fluid flow applications is the slope of the via walls. Vias made in the conventional manner have very steep wall slopes, with the slope dependent upon the incident radiation fluence (energy per unit area), and to a lesser extent, the number of laser pulses used to create the feature. Using conventional methods, very little can effectively be done to control or shape the via wall slope. One method is controlling the energy distribution of the radiation hitting the substrate. In a projection imaging system, this can be accomplished by placing ring shaped apertures on the mask, such as described in U.S. Pat. No. 5,378,137. However, the mask features used to create the hole profiles must be very small (sub-resolution for the imaging system), or they may be imaged into the ablated hole or via. The disadvantage of this method is that the small mask features can easily be damaged and also add difficulty and expense to the mask making process.

In a typical inkjet print head made currently in the industry, small ablated orifices or vias are made in the polymer film substrate at a concentration of about 300 or more ablated orifices per inch. The size of the orifices may vary depending upon the particular application, but generally have an exit diameter less than about 35 microns. The entrance orifice diameter is typically less than 100 microns, with an average entrance diameter of about 50 microns to about 60 microns being more typical. The objective of the invention described herein is to provide additional control over the shape of the orifice in addition to the traditional process controls of mask features, fluence, laser shots, and so forth in controlling the detailed shape of the orifice.

In addition to the "ring mask" method mentioned above, another method of shaping the orifice wall angle is to move the mask itself within a certain prescribed trajectory. The ability to change the hole geometry without any additional optic is a powerful and flexible process parameter, which requires that the mask be continually moved according to a prescribed set of coordinates for each and every laser pulse. The detailed trajectory of this motion has a strong influence on the final shape of the ablated orifice. An apparatus and method for controlling an ablated orifice shape using mask orbiting is described in copending U.S. patent application Ser. No. 09/196,962, entitled "MASK ORBITING FOR LASER ABLATED FEATURE FORMATION", filed on like date herewith and incorporated by reference herein.

Another method of shaping the orifice wall angle, is to displace the beam using an optical method. This can be accomplished, for example, by spinning a flat or wedge-shaped optical element between the mask and projection lens. Such a method is described in U.S. Pat. No. 4,940,881. Placing a spinning element between the mask and the projection lens has the effect of moving the image in a circular orbit. This motion changes the ablated feature profile by moving the incident light at the surface of the substrate. The disadvantage of this method is that the radius of the orbit cannot be easily changed during the machining cycle. If the optical elements are wedge-shaped, as described in U.S. Pat. No. 4,118,109, the method also has the disadvantage that the angle of the beam is altered during the orbit, which limits the smallest possible beam displacement and complicates process control. An additional limitation is that hole wall slope profiles are limited to concave geometry (see FIG. 15), when used in conjunction with a conventional laser mask (e.g. one with simple apertures in the reflecting or absorbing coating for each ablated feature), except at very low fluences.

Yet another method for moving the image on the substrate utilizes a movable mirror between the mask and the projection lens. The mirror can be tilted in such a manner that the image moves in a prescribed orbit, thereby moving the incident light at the substrate. A major disadvantage of this method is the limited sensitivity of control, since a small tilt of the mirror can be a rather large displacement of the apparent mask position. Further, such mirrors must be of a minimum thickness to insure sufficient mechanical stability and flatness of the reflecting surface. This in turn, makes for a rather large inertia, and limits the bandwidth or highest speed of the device. When the system bandwidth is limited, it places limits on the scan patterns that can be effectively used to shape the holes.

An alternative to optically or mechanically moving the mask image is to actually move the substrate. This has a disadvantage, however, that the motion of the substrate must be very precise. The requirement for high precision is due to the fact that the projection lens of the ablation system shrinks the projection mask image down to the substrate to concentrate the laser energy. Consequently, the tolerances on the motion profile also shrink proportionately. This approach usually has the same inertial problems as the tilting mirror approach discussed above, except that the problem is further aggravated by additional mass of the substrate holders and motion stages used in typical automated systems.

As can be seen, there are multiple ways by which the profile of a laser ablated feature may be controlled to some degree. However, it can also be seen that the currently available methods have limitations which restrict their usefulness. What is needed, therefore, and what is provided by the present invention, is an apparatus and method for controlling the profile of laser ablated features which is very flexible in allowing the creation of multiple types of orifice profiles, while at the same time providing accurate and repeatable results.

SUMMARY OF THE INVENTION

The present invention provides a method and apparatus for controlling the geometry of laser ablated features, and also provides a unique product formed by such method and apparatus. The apparatus of the invention includes two rotating optical elements with different motion profiles, engineered in combination to provide a specified scan pattern for the laser beam. Each optical element contributes to the total deflection of the laser beam and the angle relationship between the two optical elements determines the total radial deflection of the beam. Because the laser is pulsed during the machining cycle, each pulse lands in a different location on the substrate. The order and position in which the pulses land on the substrate allows the final shape and orientation of the ablated feature to be accurately controlled. With the inclusion of repeatable motion control hardware, the pattern can be repeated on subsequent substrates. The relative rotational speeds of the two optics can be altered to create different fluence patterns on the substrate and therefore change the wall slope of the ablated features accordingly. In addition, the angular relationship between the two rotating optics may be controlled to produce an ablated feature having the desired shape. The angular relationship between the two optics is controlled by altering the relative velocity of the optical elements (e.g., accelerating or decelerating the optical element). By controlling the combination of rotational velocity and relative angle between the optical elements, the ablated feature may be formed to have any of a variety of chosen wall slope configurations. In addition, the apparatus and method described herein further allow the axial orientation of the ablated features to be controlled, thereby permitting the creation of unique and useful products.

The process of this invention may be employed to ablate a variety of materials. For instance, the process may be used to etch or expose patterns in organic or inorganic photoresist during semiconductor fabrication using a variety of radiation sources, such as x-rays and ultraviolet light, including deep ultraviolet light. The process of this invention can be employed to ablate features in substrates that either completely traverse the substrate (i.e., holes or vias), or to ablate a feature of a given depth which is less than the total depth of the substrate, often described as a "blind" feature.

As used herein, the term "laser feature" includes holes, bores, vias, nozzles, orifices, and the like, and may be fully ablated through the substrate, or only partially through the substrate ("blind" features).

BRIEF DESCRIPTION OF THE DRAWINGS

FIGS. 4a through 4c schematically illustrate different phase relationships between the optical elements of FIG. 3.

DETAILED DESCRIPTION OF THE INVENTION

Figure 1:
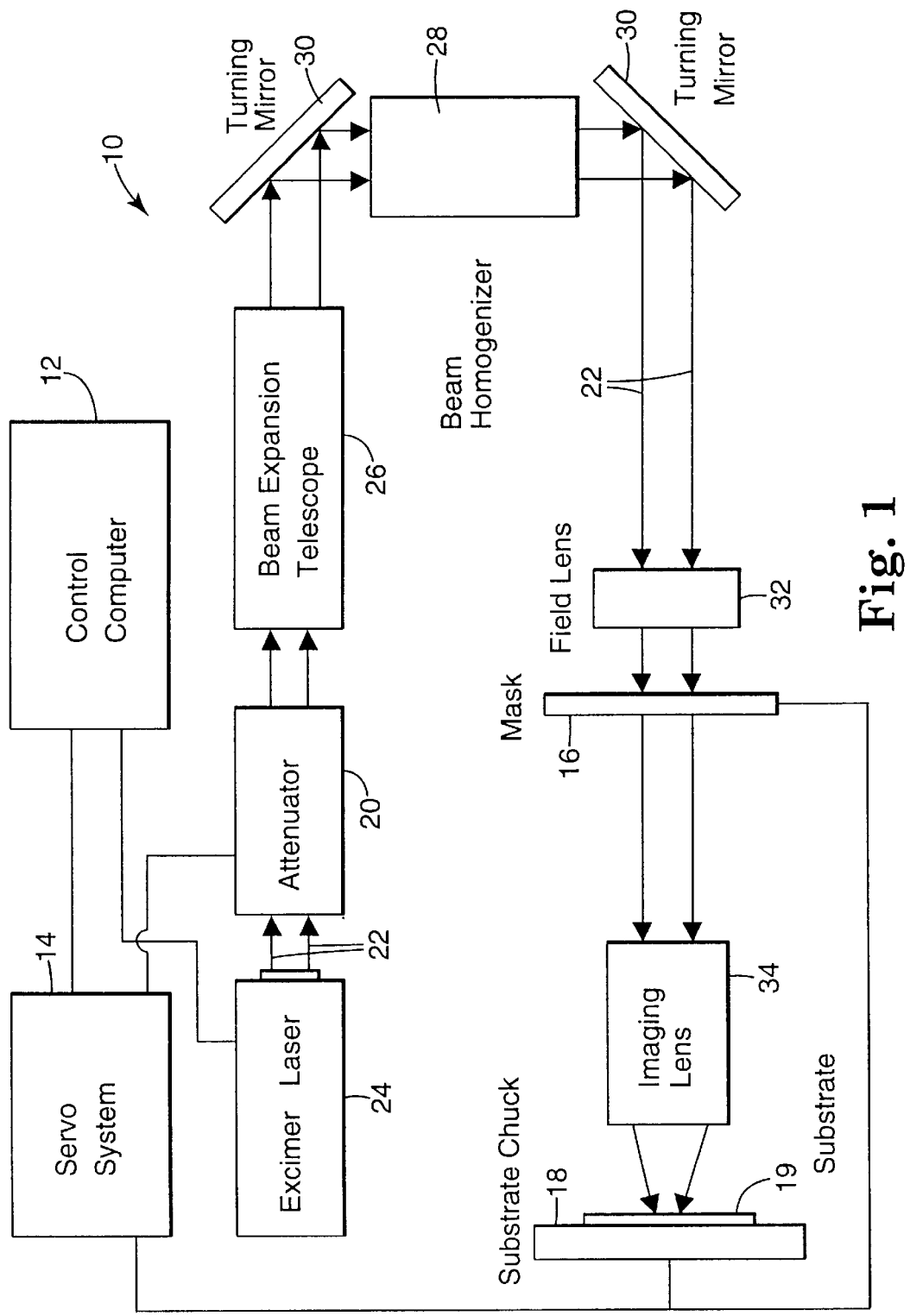
FIG. 1 schematically illustrates a conventional excimer laser machining system employing a mask for irradiating a substrate.
Figure 2:
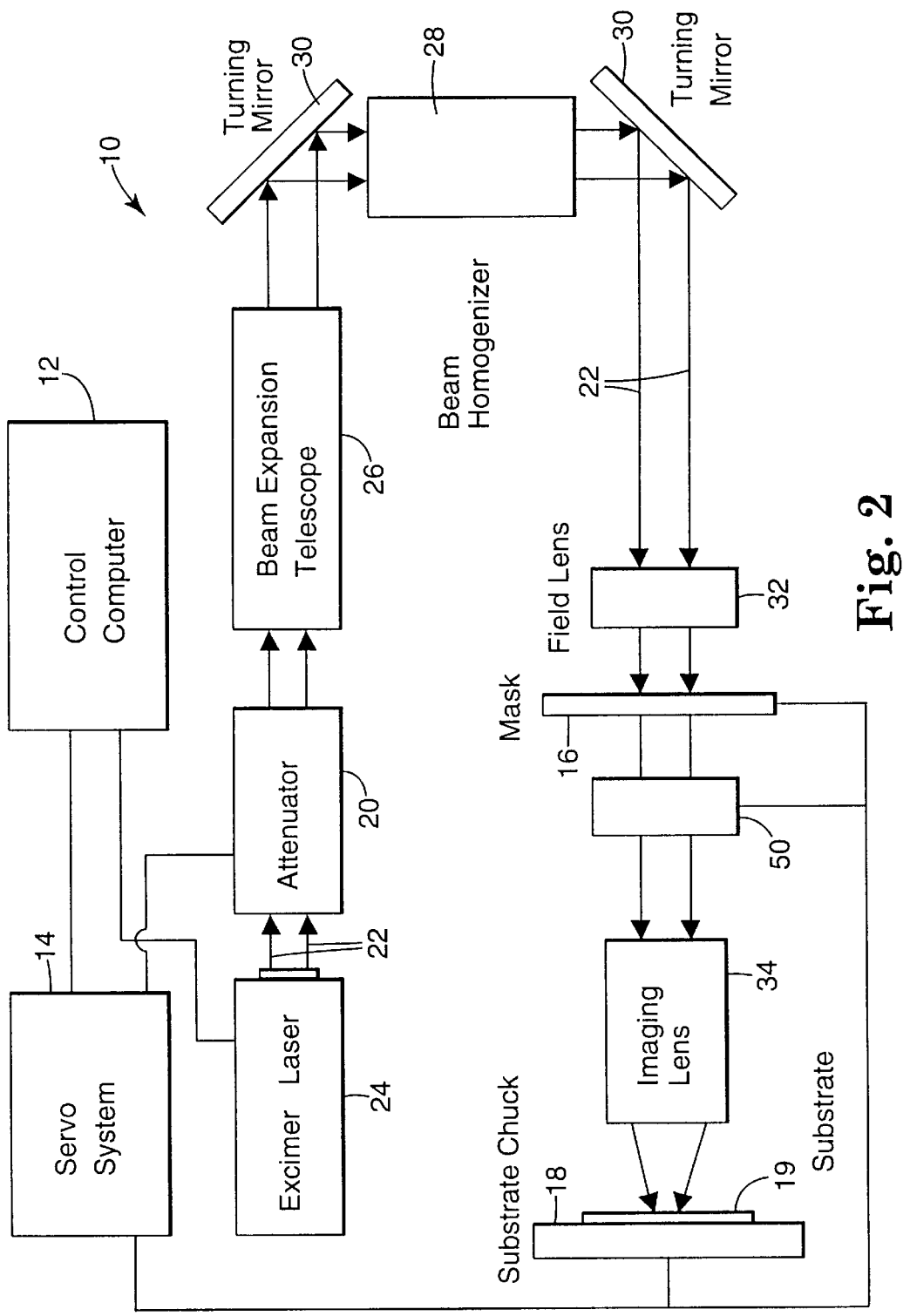
FIG. 2 illustrates the laser machining system of FIG. 1, and further employing the optical scanner of the present invention.

As discussed above, FIG. 1 illustrates the basic layout of a conventional excimer laser machining system 10. FIG. 2 illustrates the laser ablated feature formation device of the present invention, referred to herein as an optical scanner 50. As seen in FIG. 2, optical scanner 50 is inserted into laser machining system 10 between imaging lens 34 and mask 16. Optical scanner 50 is controlled by computer 12 and servo system 14.

Figure 3:
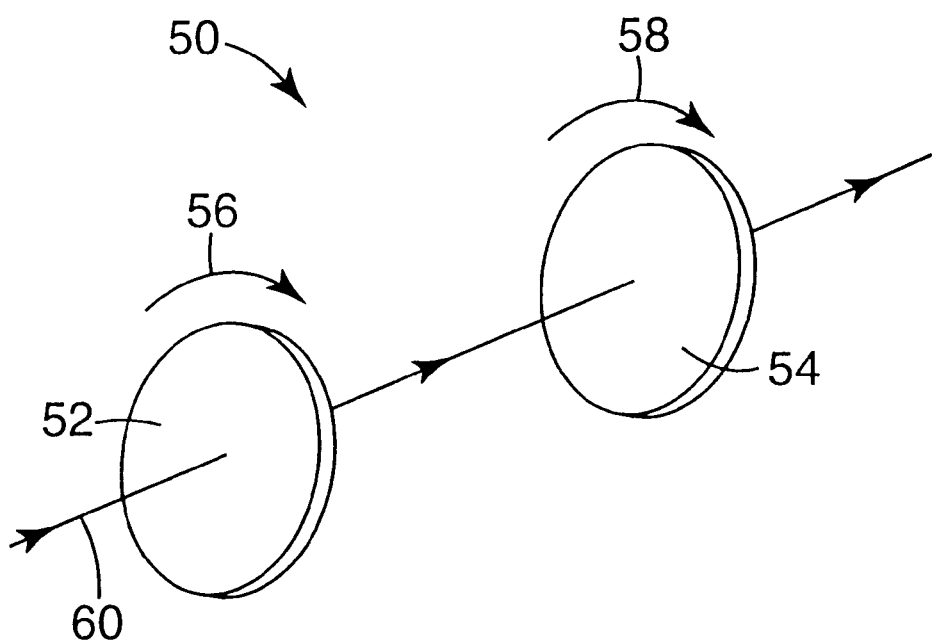
FIG. 3 schematically illustrates the optical elements of the present invention.

A generalized view schematic of optical scanner 50 is shown in FIG. 3. Optical scanner 50 includes dual spinning transparent disks 52,54. First spinning transparent disk 52 and second spinning transparent disk 54 may have different thicknesses. However, disks 52,54 are of substantially uniform thickness (i.e., the disks 52,54 have parallel faces). Disks 52,54 may be rotated at different angular velocities 56,58. Line 60 depicts a beam of radiation passing through disks 52,54. Methods for rotation of optical elements like disks 52,54 are well known and are disclosed, for example, in U.S. Pat. Nos. 4,119,109; 4,822,974; and 4,940,881.

FIGS. 4a, 4b, and 4c illustrate side views of the optical scanner 50 shown in FIG. 3. It should be recognized that FIGS. 4a, 4b and 4c represent specific relationships between transparent disks 52,54 at particular instances in time while disks 52,54 are rotating. It will be understood that since disks 52,54 are both constantly rotating, the extent to which the disks 52,54 are in or out of phase is also constantly changing. Likewise, the point at which the beams 60 strikes the substrate after exiting second disk 54 will also be constantly changing, as discussed herein below.

In FIG. 4a, first disk 52 and second disk 54 are rotated in phase, with the angle of each disk 52,54 having the same angle against the original path of the incident beam of radiation 60 as the disks 52,54 are rotated. That is, the disks 52,54 are tilted at an angle to the reference plane that is perpendicular to the optical axis 62 of beam 60. Likewise, disks 52,54 are rotated to maintain the same angle relative to optical axis 62. The beam 60 emanating from a radiation source is refracted through first disk 52 such that it exits first disk 52 as first exit beam 64, which forms a circular pattern 66 due to the rotation of first disk 52. Upon exiting first disk 52, first exit beam 64 enters second disk 54 at a distance offset from optical axis 62, and is then further refracted by second disk 54 such that second exit beam 68 is yet further from optical axis 62. Because second disk 54 is also spinning, a final circular pattern 70 is produced from second exit beam 68.

In FIG. 4b, the disks 52,54 are 180 degrees out of phase. This configuration results in first exit beam 64 being refracted such that second exit beam 68 is in alignment with optical axis 62.

In FIG. 4c, disks 52,54 are out of phase less than 180 degrees. The second exit beam 68 will be anywhere along circular arc 72 depending on the extent to which the disks 52,54 are out of phase. When disks 52,54 are less than 180 degrees out of phase, but more than 90 degrees out of phase, the second exit beam 68 will fall within innerarea 76. When disks 52,54 are less than 90 degrees out of phase but are not in phase, as in FIG. 4a, the second exit beam 68 will fall within outerarea 74.

It may be appreciated that mathematically the formulas that deal with the motion of each disk 52,54 may be expressed as follows:

$$\theta_1(t)=\theta_{O1}+\omega_{O1}t+\tfrac{1}{2}\alpha_1 t^2$$

$$\theta_1(t)=\theta_{O2}+\omega_{O2}t+\tfrac{1}{2}\alpha_2 t^2$$

where $$\alpha_1=0$$

$$\theta_{O1}=\theta_{O2}$$

$$\omega_{O1}=\omega_{O2}$$

then $$\theta_{diff}(t)=\theta_2(t)-\theta_1(t)=\tfrac{1}{2}\alpha_2 t^2$$

In these formulas, $\theta$ represents the initial disk angle, $\omega$ is the speed, and a is the disk acceleration. It should be noted that the above mathematical formulas are limited to the case where disks 52,54 are undergoing constant acceleration.

Figure 5A:
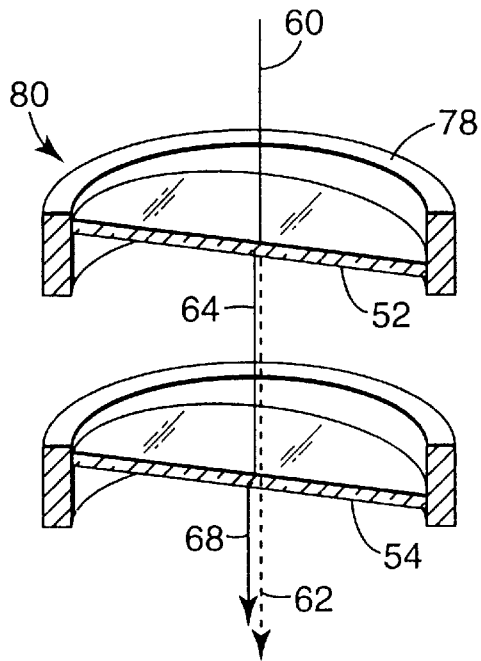
FIGS. 5a through 5c further schematically illustrate the phase relationship between the optical elements shown in FIGS. 3 and 4a through 4c.
Figure 5B:
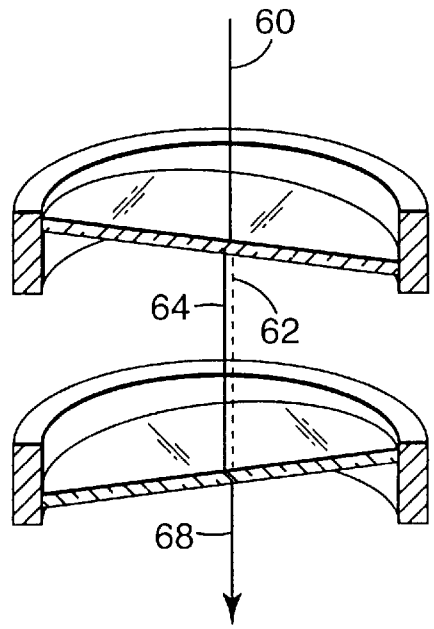
Figure 5C:
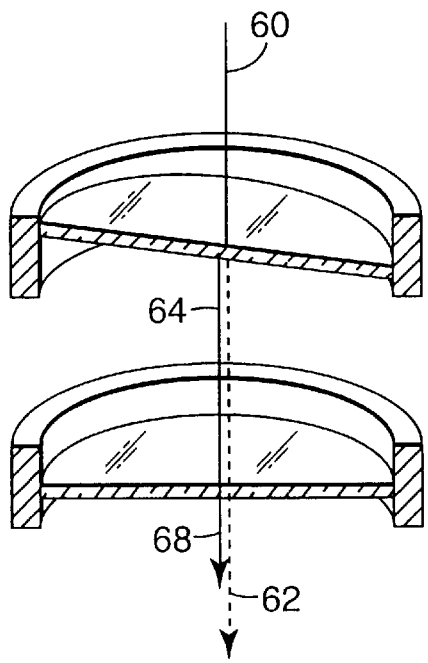

FIGS. 5a, 5b, and 5c further demonstrate the concepts discussed with respect to FIGS. 4a, 4b, and 4c. FIG. 5a shows an arrangement of disks 52,54 that are in phase, as in FIG. 4a. In FIG. 5a, the beam of radiation 60 enters optical disk 52 where it is refracted, exiting as first exit beam 64 which is offset from the original line of beam 60, as depicted by phantom line 62, showing the optical axis of beam 60. It is noted that in the depiction of FIG. 5a, first disk 52 is set at an angle within disk holder 78, which may be configured to cooperate with a device (not shown) such as a servo motor, which rotates the entire disk assembly 80 around optical axis 62.

In FIG. 5b, on the other hand, disks 52,54 are 180 degrees out of phase. Thus, in FIG. 5b the second exit beam 68 is refracted back and merges with optical axis 62.

FIG. 5c shows the configuration in which the disks 52,54 are 90 degrees out of phase. In FIG. 5c, the first exit beam 64 retains its path through second disk 54 (that is, first exit beam 64 is not refracted by second disk 54). It should be noted that the elements of FIGS. 5a, 5b, and 5c are not to scale, and are rather intended to conceptually show the path of a beam, such as a laser beam, as the beam passes through disks 52,54.

Figure 6:
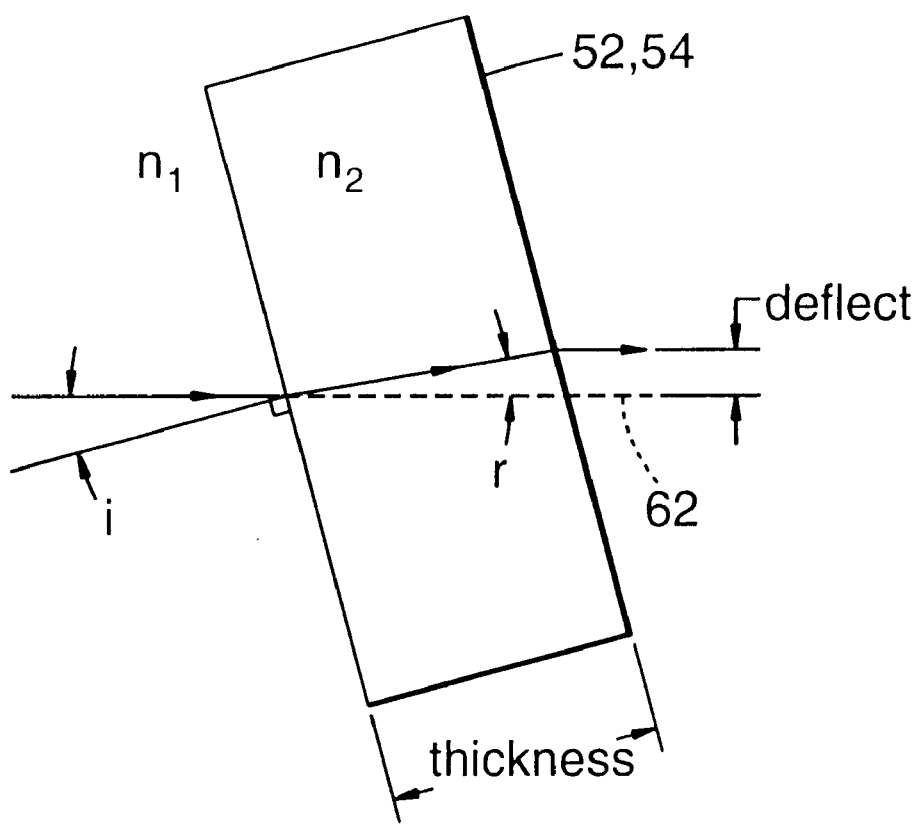
FIG. 6 illustrates the refraction of a light beam through an optical element.

The mathematical formulas which may be employed to calculate the path of the beam are described below, first for the case referred to herein as "speed control", and second for the case referred to herein as "phase control". Speed control refers to the condition where the first and second disks 52, 54 have no relative acceleration and are rotating at different speeds, with a speed ratio which is relatively large (greater than one). Phase control refers to the condition where the first and second disks 52, 54 are initially rotating at identical speeds, with the disks 52, 54 having a relative acceleration.

Where the deflection of a beam through a single optical element (as shown in FIG. 6) is calculated by the equations:

$$\text{deflect}=\text{thickness}*\sin(i-r)/\cos(r)$$

where $$r=\sin^{-1}(n_1*\sin(i)/n_2)$$

$$n_1, n_2=\text{indexes of refraction}$$

then for phase control:

$$x(t)=\text{deflect}_1 \cos(\omega_1 t)+\text{deflect}_2 \cos(\omega_2 t+\theta_{diff}(t))$$

and $$y(t)=\text{deflect}_1 \sin(\omega_1 t)+\text{deflect}_2 \sin(\omega_2 t+\theta_{diff}(t))$$

and for speed control:

$$x(t)=\text{deflect}_1 \cos(\omega_1 t)+\text{deflect}_2 \cos(\omega_2 t);$$

and $$y(t)=\text{deflect}_1 \sin(\omega_1 t)+\text{deflect}_2 \sin(\omega_2 t);$$

then, for either phase control or speed control:

$$\text{radius}(t)=\text{sqrt}(x(t)^2+y(t)^2)$$

In these formulas, $\theta$ represents the initial disk angle, $\omega$ is the speed, and $\alpha$ is the disk acceleration.

FIGS. 7, 8, 9 and 10 illustrate the laser shot pattern obtained when disks 52,54 are rotated at different speeds. It can be seen that the speed ratio between disks 52,54 can be changed to create a different pattern of laser shots on the substrate and thereby change the ablated features wall slope accordingly.

Figure 7:
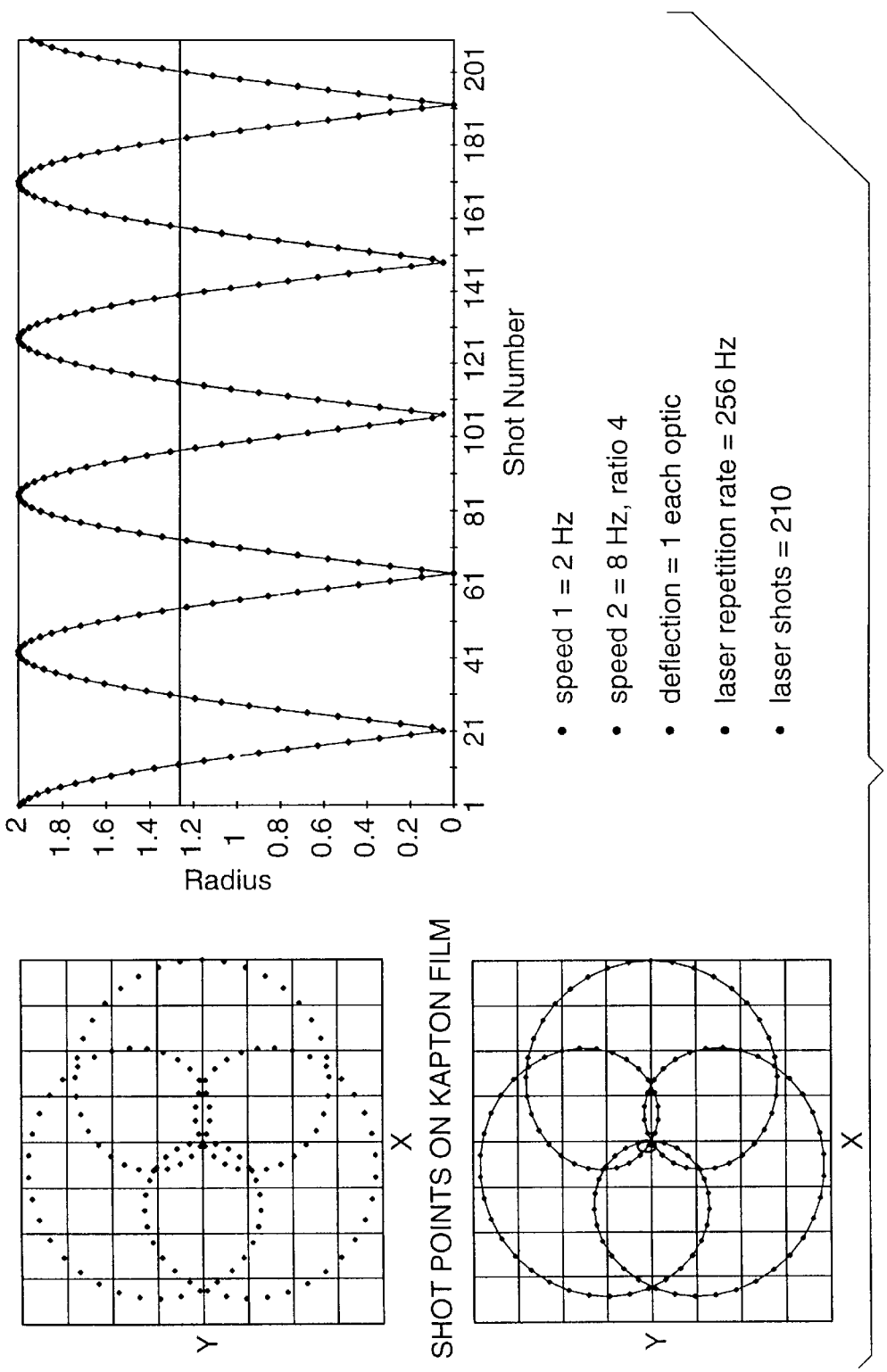
FIGS. 7 through 10 illustrate the laser shot pattern obtained when the optical elements are rotated at fixed, different speeds.

In FIG. 7, the speed of disks, 52,54 can be seen to be insufficient, as the pattern obtained does not substantially fill all of the space intended to form the bore. In the example of FIG. 7, the speed of disk 52 is 2 Hz, the speed of disk 54 is 8 Hz, the speed ratio is 4, the deflection is one per optical element, the laser repetition rate is 256 Hz, and the number of laser shots is 210. It can be seen that if small speeds are used, such as those in the example of FIG. 7, then the randomization of the location of the laser shots is insufficient to create a uniform feature.

Figure 8:
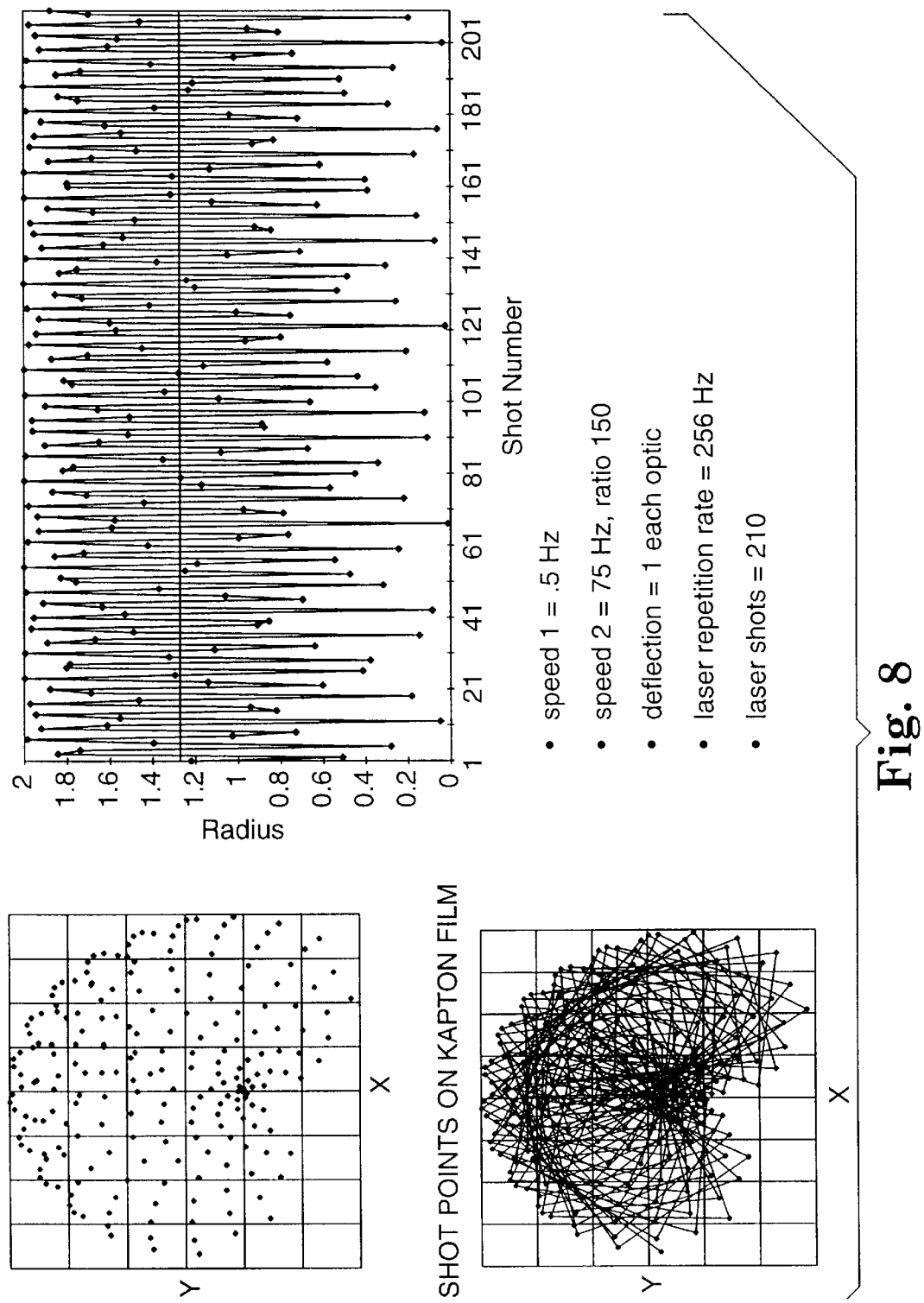

In FIG. 8, the speed of the disks is also insufficient to obtain a uniform ablated feature. In FIG. 8, the speed for disk 52 is 0.5 Hz, the speed for disk 54 is 75 Hz, the speed ratio is 150, the deflection is one per optical element, the laser repetition rate is 256 Hz, and the number of laser shots is 210. Thus, in FIG. 8, it is demonstrated that if the rotational speed of one optical disks 52,54 is slow compared to the laser firing time, then a majority of the laser shots will occur in one quadrant, thereby malforming the ablated feature.

Figure 9:
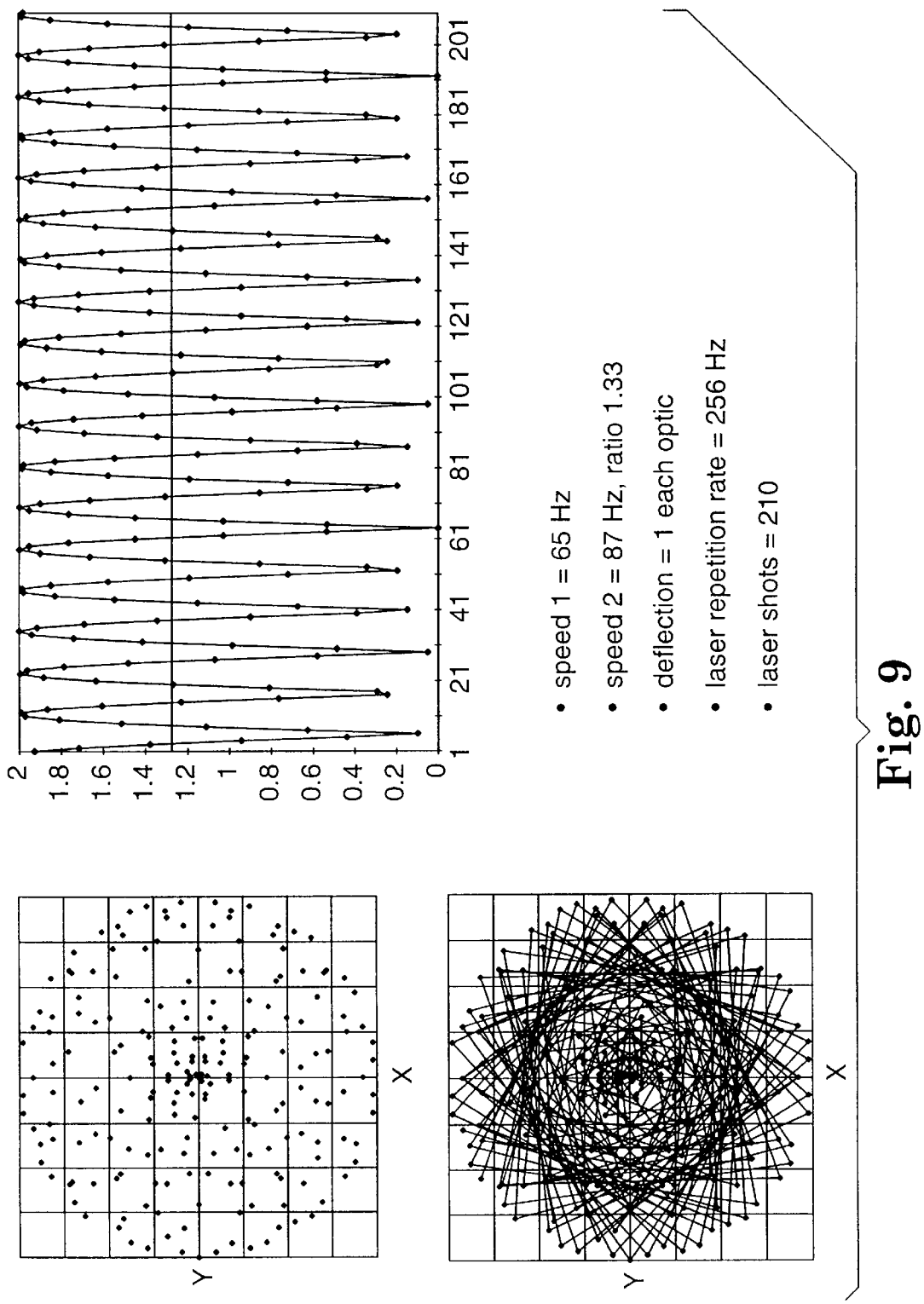
Figure 10:
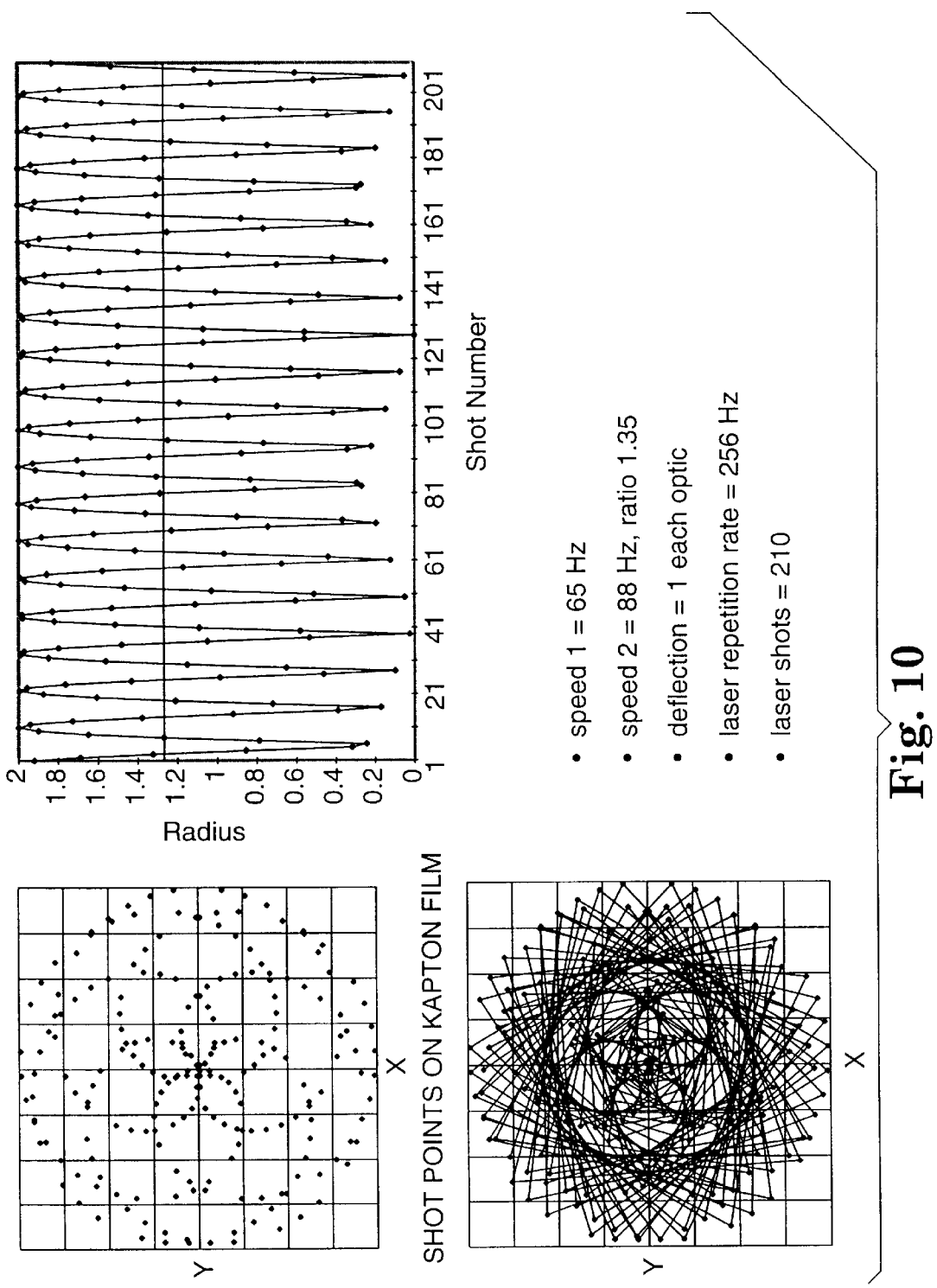

As the speed of disks 52,54 and the speed ratio between disks 52,54 increases, the pattern of laser shots on the substrate becomes more uniform, as shown in FIG. 9. In FIG. 9, the speed for disk 52 is 65 Hz, the speed for disk 54 is 87 Hz, the speed ratio is 1.33, the deflection is one per optical element, the laser repetition rate is 256 Hz, and the number of laser shots is 210. The faster speeds and smaller ratios provide a sufficiently uniform pattern of laser shots to produce well-formed ablated features.

The drawback of this operating configuration is that the pattern of laser shots is very sensitive to (e.g., controlling only the speed of disks 52,54) the speed of the two rotating disks 52,54. Changing the speed of either of disks 52 or 54 by even a single Hertz will dramatically alter the ablation pattern. This effect can be seen by comparing FIGS. 9 and 10, where the only difference is that in FIG. 10 the rotational speed of disk 54 has been increased by one Hertz.

Another disadvantage of this particular operating configuration is that the light pattern can be different from part to part because the optical relationship between disks 52,54 is not controlled. This means that the first and last pulse may not occur at the same point for each part. This is especially true at slow rotational speeds.

Thus, for the purpose of creating uniform ablated features in a substrate, the use of fixed but different speeds for disks 52,54 may produce results that are less than what is otherwise desirable. It is therefore, contemplated that an ablated feature having an accurate, repeatable shape can be made by additionally controlling the angular relationship between disk 52 and disk 54. This may be accomplished by changing the relative velocity of each disk 52,54, as by acceleration (e.g. "phase control").

Figure 11:
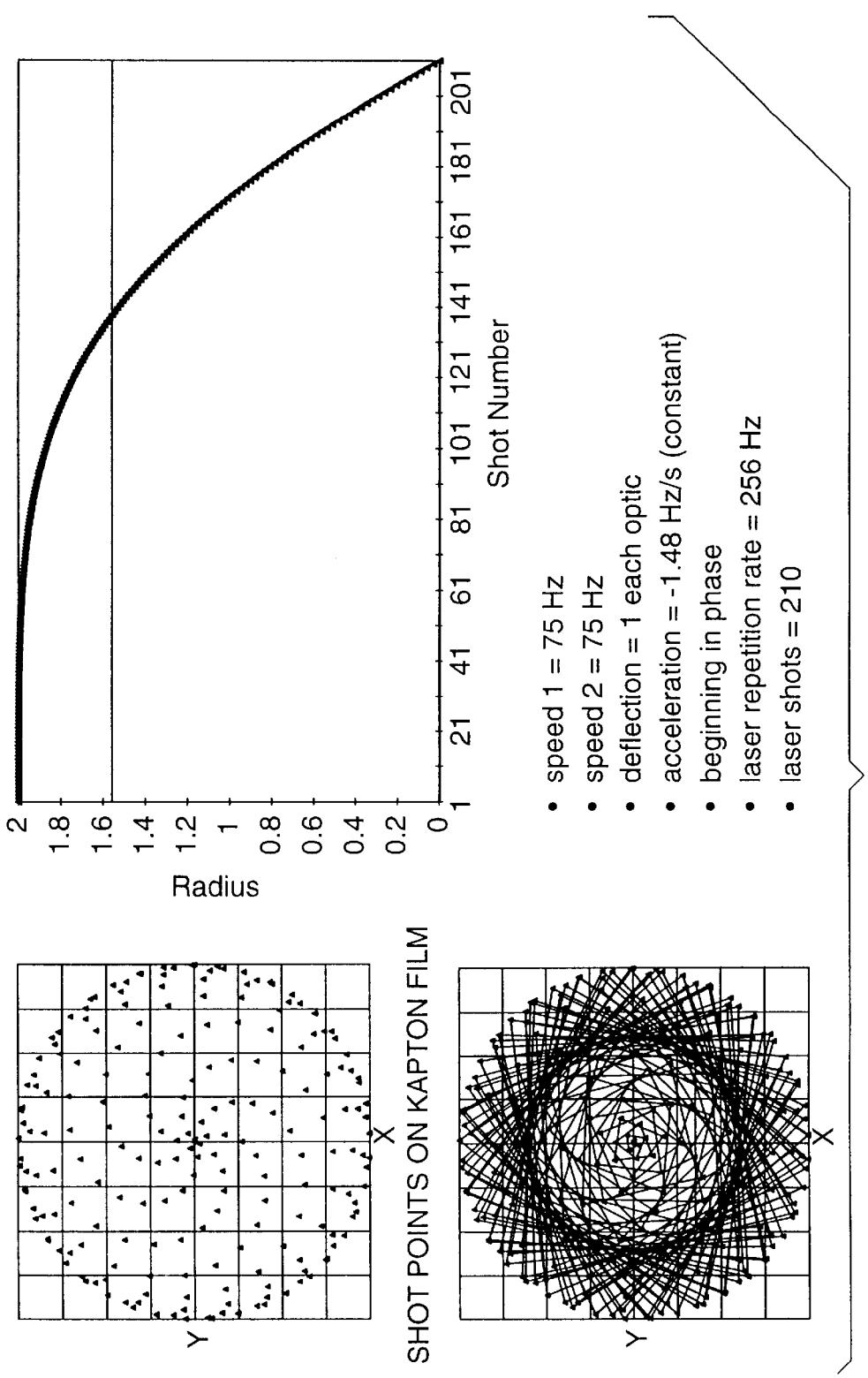
FIGS. 11 and 12 illustrate the laser shot pattern obtained by altering the angular relationship between the optical elements by changing the relative velocity of the optical elements (phase control).
Figure 12:
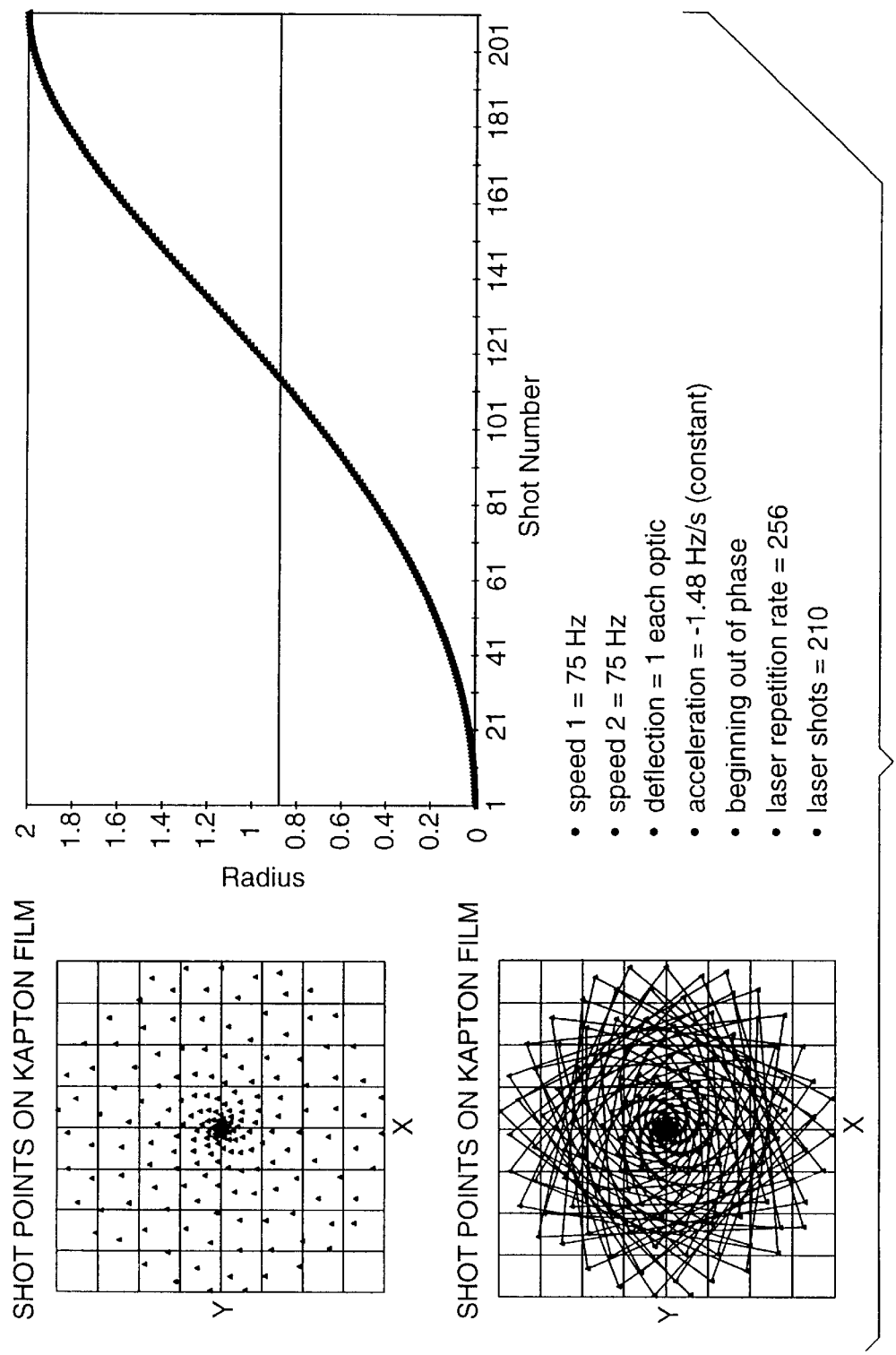

In FIG. 11, disks 52,54 are started in phase, with the following parameters. The initial speed for disk 52 is 75 Hz, the speed for disk 54 is 75 Hz, disk 52 is accelerated by a rate of −1.48 Hz/sec., the deflection is one per optical element, the laser repetition rate 256 Hz, and the number of laser shots is 210. In FIG. 12, the disks are started out of phase, with all other parameters being identical to those described with reference to FIG. 11. When comparing FIGS. 11 and 12, it can be seen that by simple deceleration of one optical element, the beam path is changed dramatically. This added angular control between disks 52,54 provides additional flexibility to the system as compared to that illustrated in FIGS. 7 through 10, such that an exact path may be specified for each of the laser pulses. The positioning of each laser shot is repeatable because the angular relationship between disks 52,54 is controlled such that the orbital pattern can be duplicated, thereby allowing repeatable features to be formed.

Figure 13:
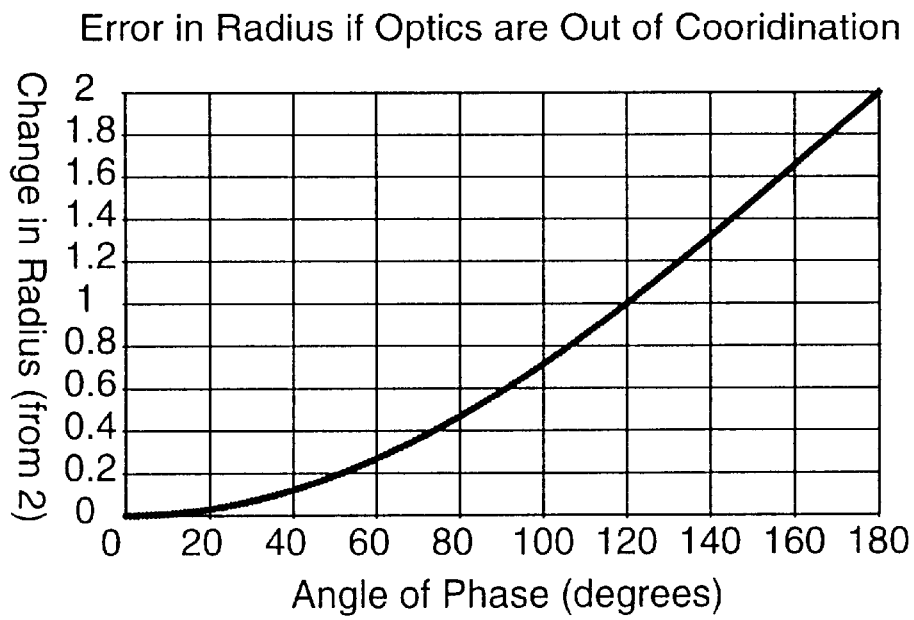
FIGS. 13 and 14 illustrate that a radial path is relatively insensitive to angular deviations of the optical elements.
Figure 14:
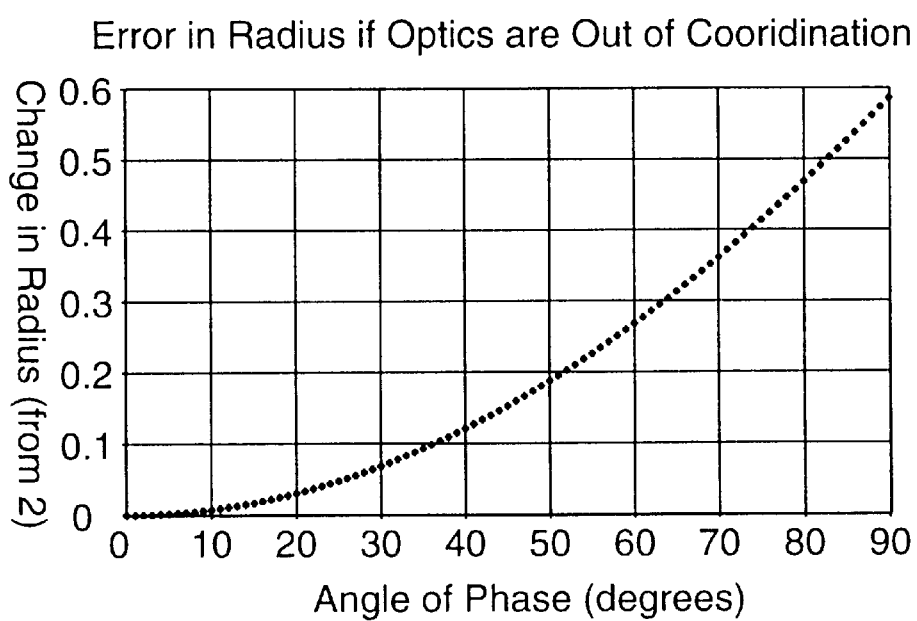

FIGS. 13 and 14 demonstrate that the radial path of the beam is relatively insensitive to angular deviations, thus leading to a superior method for shaping the ablated features as compared to the purely "speed control" method of FIGS. 7 through 10.

Figure 15:
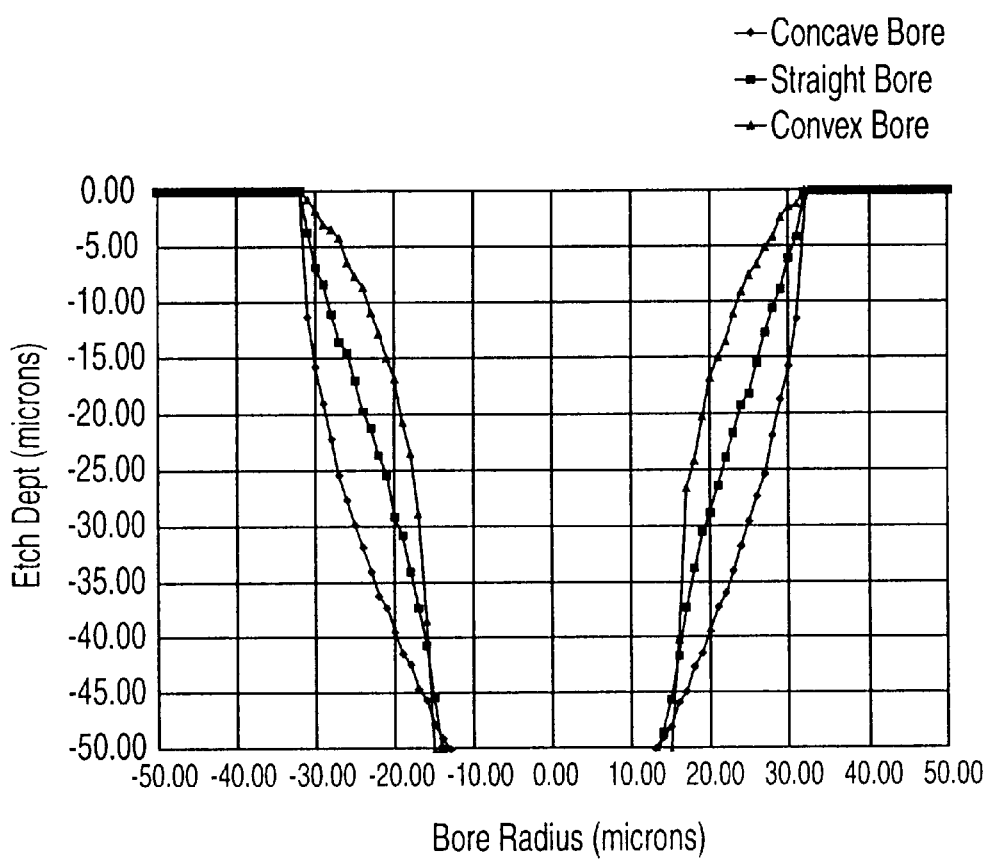
FIG. 15 illustrates how the ablated orifice can have a straight, concave, or convex wall shape as measured from the orifice axis.

FIG. 15 illustrates how the ablated feature in the substrate can have a straight, concave, or convex wall shape, as measured from the bore axis. The wall shape may be adjusted by controlling the starting position and acceleration of the disks 52,54, which allows material to be ablated at different rates from inside the hole and thereby create different wall shapes. The ability to modify the pattern of laser shots (and thereby shape the wall of the bore) by simply changing the acceleration and starting position of each optical element 52,54 is a powerful and flexible process parameter which has been unavailable heretofore.

It should be noted that the use of only a single rotating disk, as described in U.S. Pat. No. 4,940,881, can produce only a concave wall shape (see FIG. 15) without the use of complicated mask structures which add significantly to the cost of the mask. In the context of fluid control nozzles, a concave wall shape is the least desirable shape, with straight and convex wall shapes being preferred, in that order. Further, to achieve different wall shapes with only a single rotating disk, different masks must be used, again adding significant costs to the manufacturing process. The dual rotating disks 52, 54 of the present invention provide a significant advantage over the prior art, in that no complicated mask structures are needed, and the same mask can be used to create different wall shapes, simply by controlling the rotational speed and relative acceleration of the disks 52, 54.

Figure 16:
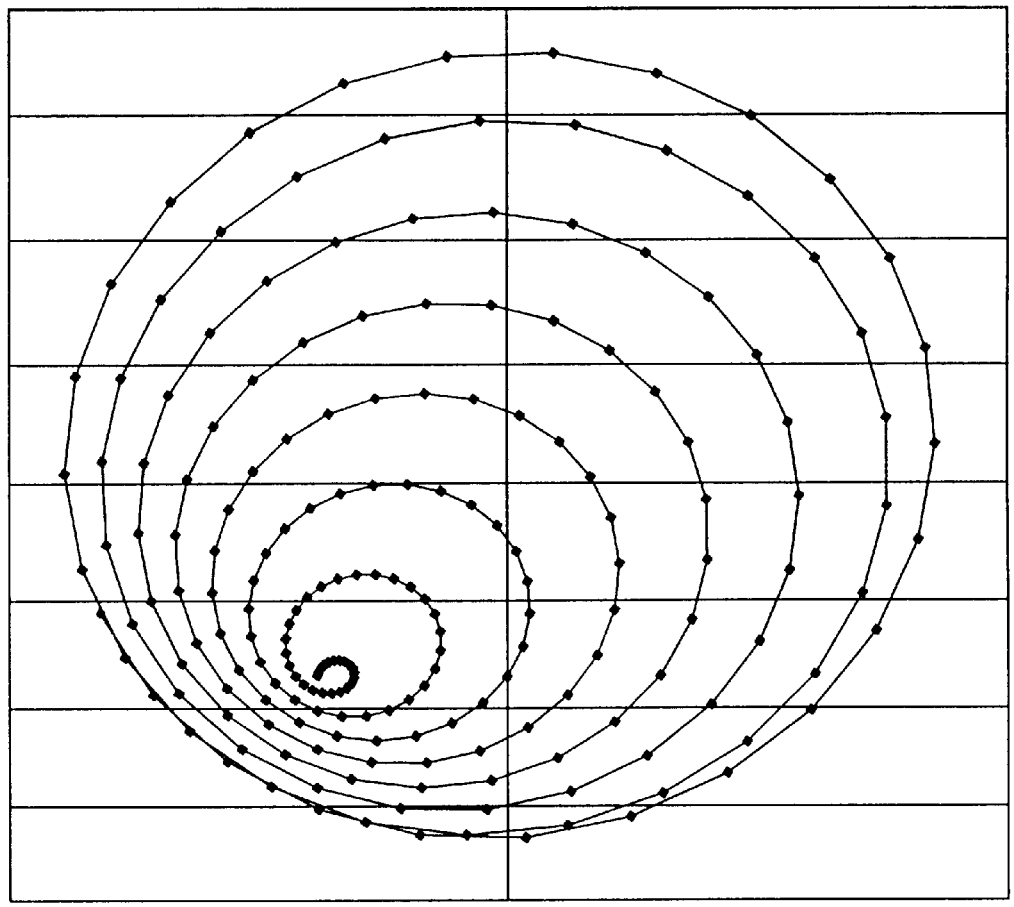
FIG. 16 illustrates a laser shot pattern for creating nozzles having axis which are non-orthogonal to the substrate surface.

A particularly unique ability of the present invention allows the ablated features to have an axial orientation which is not perpendicular to the surface of the substrate. That is, the axis of the orifice may be tilted with respect to the substrate surface. Such a variable axial orientation of the orifice is achieved by creating a spiraling laser shot pattern (as depicted in FIG. 16), while allowing the center of each circular "orbit" to slowly drift in a prescribed direction during the ablation process. Such a laser shot pattern is not possible with, for example, a single rotating optical element as shown in U.S. Pat. No. 4,940,881 which can only move the light in a circular pattern.

Figure 17:
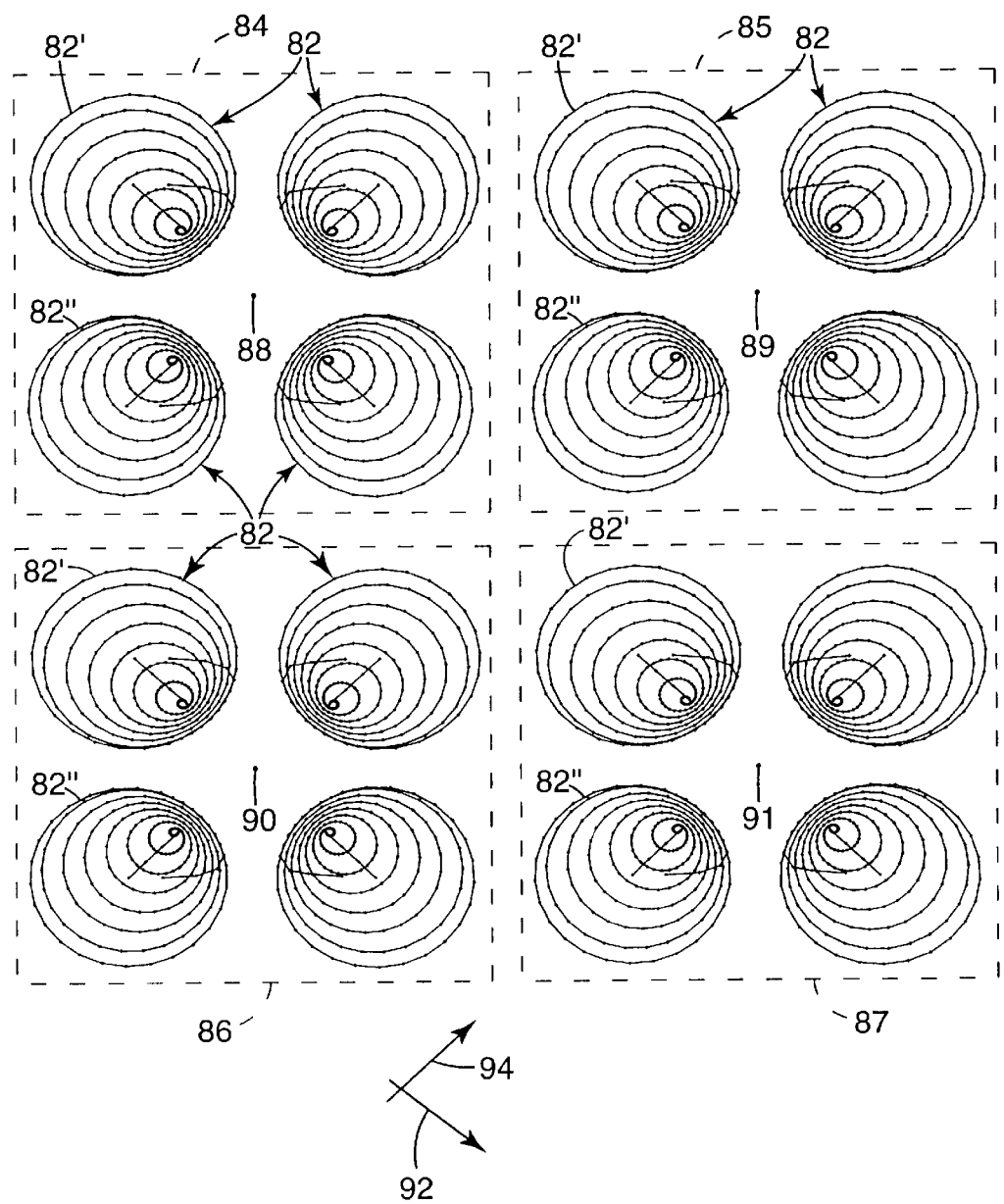
FIG. 17 illustrates nozzles arrays in which the longitudinal axes of arrays of nozzles are inclined in predetermined directions, for the purpose of directing fluids exiting these nozzle arrays, and controlling the relative direction of the exiting fluids.

The ability to create an ablated orifice with a non-orthogonal axis is a significant advance and advantage in fluid flow applications. For example, as shown in FIG. 17, a group of two or more nozzles may be positioned such that the axis of each nozzle is directed toward a common predetermined point. In FIG. 17, individual nozzles 82 are arranged in arrays 84, 85, 86, 87, with four nozzles 82 per array 84, 85, 86, 87. In each array 84, 85, 86, 87, the nozzles 82 are angled toward a common point 88, 89, 90, 91, respectively, in the center of each array 84, 85, 86, 87. Such an orientation of the nozzles 82 within each array 84, 85, 86, 87 significantly improves, for example, the ability to control the direction in which a fluid drop is projected through each nozzle 82. This control thereby allows or prevents, for example, the coalescence of drops after exiting the nozzles 82. Alternatively, it can control the relative placement of drops of fluid on a target material, such as placement of ink from an inkjet print head on paper, thereby effecting the quality of print. It will be recognized by those skilled in the art that any number of nozzles and arrays may be ablated to achieve the necessary result for a particular application.

It can be seen from examining FIG. 17 that the axis of at least one nozzle 82' in each of arrays 84, 85, 86, 87, is aligned with a first common axis 92, while a second nozzle 82" of each array 84, 85, 86, 87 is aligned with a second common axis 94. Similarly, each nozzle 82 of each array 84, 85, 86, 87 is aligned with a predetermined common axis. When forming arrays 84, 85, 86, 87, the nozzles 82' are ablated in one step, nozzles 82" are ablated in a separate step, and so on. The different directional axes of the nozzles 82 are created by simply changing the ablation pattern by altering the rotation of disks 52, 54 in a predetermined manner.

As noted above, the nozzle arrangement illustrated in FIG. 17 is useful in applications where control of the individual drops exiting the nozzles is desired, for example, to allow or prevent the coalescence of drops after exiting the nozzles 82. The tendency for individual drops to coalesce or not can be controlled by altering the orientation of the longitudinal axes of the nozzles in each array. Particular uses include print heads for ink jet printers (having nozzles with exit diameters in the range of 8 to 35 microns, and preferably between 10 and 25 microns) and aerosol nozzles plates for applications such as medicinal inhalers (having nozzles with exit diameters of less than about 5 microns diameter and preferably in the range of 0.5 to 3.0 microns).

The inventive optical scanner described herein provides significant advantages over other methods of controlling the wall shape of an ablated feature. In particular the invention allows precise, repeatable placement of individual laser shots in any of a variety of manners. The individual laser shots may be placed in widely varying yet easily controllable patterns to achieve the desired wall shape and axial orientation of the ablated feature.

What is claimed is:

1. A method for forming an arbitrarily chosen complex shape for an ablated feature in a substrate, where the feature is ablated using a laser machining system including a mask and imaging lens system, the method for controlling the shape of the ablated feature comprising:

providing a first rotatable transparent plane-parallel plate and a second rotatable transparent plane-parallel plate between a mask and an imaging lens of a laser machining system, wherein each of the first and second plane-parallel plates are tilted with respect to an optical axis of the imaging lens and rotated about the optical axis of the imaging lens;

identifying a plurality of discrete sequential ablation positions on a substrate at which the substrate is to be ablated to form an arbitrarily chosen complex shape for an ablated feature;

calculating a plurality of sequential plane-parallel plate positions for each of the first and second plane-parallel plates to direct an image of the mask through the imaging lens to each of the sequential ablation positions;

continuously rotating the first and second plane-parallel plates with a relative acceleration between the first and second plane-parallel plates such that the first and second plane-parallel plates move through each of the sequential plate positions to direct the mask image to each of the sequential ablation positions, the relative acceleration between the first and second plane-parallel plates controlled such that at each of the sequential ablation positions a pulse of radiation is fired from the laser, the pulse of radiation directed through the mask, first and second plane-parallel plates and imaging lens system to each sequential ablation position on the substrate.

2. The method of claim 1, wherein the laser fires a rate in the range of 100 to 300 Hz.

3. The method of claim 1 in which the tilt angles of the plane-parallel plates are substantially equal.

4. The method of claim 1 in which the laser is a pulsed excimer laser.

5. The method of claim 1 in which each pulse of radiation passes through a refractive or diffractive homogenizer prior to illuminating the mask.

6. The method of claim 1 in which the imaging lens system has a demagnification in the range of 2X to 5X.

7. The method of claim 1 in which the imaging lens system is telecentric on the substrate side.

* * * * *

UNITED STATES PATENT AND TRADEMARK OFFICE
CERTIFICATE OF CORRECTION

PATENT NO. : 6,120,976
DATED : September 19, 2000
INVENTOR(S) : Daniel J. Treadwell and Curtis L. Shoemaker It is certified that error appears in the above-identified patent and that said Letters Patent is hereby corrected as shown below:

Column 7,
Line 56, "$\theta_1(t)$" should read -- $\theta_2(t)$ --.

Column 8,
Line 2, "a" should read -- $\alpha$ --.

Signed and Sealed this

Sixth Day of November, 2001

Attest:

NICHOLAS P. GODICI
Attesting Officer
Acting Director of the United States Patent and Trademark Office